United States Patent [19]
Wischermann

[11] Patent Number: 5,612,752
[45] Date of Patent: Mar. 18, 1997

[54] NOISE REDUCTION METHOD AND APPARATUS

[75] Inventor: Gerhard Wischermann, Weiterstadt, Germany

[73] Assignee: U.S. Philips Corporation, New York, N.Y.

[21] Appl. No.: 573,915

[22] Filed: Dec. 18, 1995

Related U.S. Application Data

[63] Continuation of Ser. No. 368,739, Jan. 4, 1995, abandoned, which is a continuation of Ser. No. 971,381, Nov. 4, 1992, abandoned.

[30] Foreign Application Priority Data

Nov. 14, 1991 [DE] Germany ............... 41 37 404.5

[51] Int. Cl.$^6$ ............................................. H04N 5/213
[52] U.S. Cl. ............................. 348/701; 348/622
[58] Field of Search .................... 348/699–701, 348/607, 618, 622, 671, 678, 687; H04N 5/213

[56] References Cited

U.S. PATENT DOCUMENTS

| | | | |
|---|---|---|---|
| 4,485,403 | 11/1984 | Illetschko | 358/167 |
| 4,525,741 | 6/1985 | Chahal et al. | 358/179 X |
| 4,652,907 | 3/1987 | Fling | 358/36 |
| 4,807,035 | 2/1989 | Sayliss | 358/174 |
| 4,857,625 | 6/1989 | Douziech et al. | 358/174 |
| 4,926,361 | 5/1990 | Ohtsubo et al. | 358/167 X |

FOREIGN PATENT DOCUMENTS

| | | |
|---|---|---|
| 3121597 | 12/1982 | Germany. |
| 3121611 | 12/1982 | Germany. |
| 3609887 | 9/1986 | Germany. |

*Primary Examiner*—Victor R. Kostak
*Attorney, Agent, or Firm*—Laurie E. Gathman

[57] ABSTRACT

In a method of reducing the noise in a signal from a motion detector for video signals, in which a part of the amplitude range of the signal below a threshold value is suppressed, the minimum of the signal is determined by means of a control loop, starting with a minimum threshold value. The threshold value is increased when the minimum of the signal exceeds a given value, preferably 0, and is reduced when the minimum of the signal lies below the given value.

5 Claims, 2 Drawing Sheets

NOISE REDUCTION METHOD AND APPARATUS

This is a continuation of application Ser. No. 08/368,739 filed Jan. 4, 1995, abandoned which is a continuation of application Ser. No. 07/971,381 filed Nov. 4, 1992, abandoned.

BACKGROUND OF THE INVENTION

The invention relates to a method for reducing the noise in a signal from a motion detector and further relates to a circuit arrangement for carrying out the method.

For the reduction of noise in video signals circuits are known which are based on the principle of time recursive filtering. When an output signal delayed by one picture period is fed back to the input of a recursive filter, the noise component is averaged over a plurality of picture periods and is thus reduced. The degree of noise reduction then depends on the magnitude of the fed-back picture signal in proportion to the input signal.

In order to preclude blur as a result of the recursive filter in the case of moving picture scenes, DE-A-31 21 597 discloses a system for the reduction of noise in a television signal, which system comprises a motion detector to control the magnitude of the fed-back video signal in dependence upon the motion occurring in the picture. In the known system, a motion signal is generated by forming the difference between the non-delayed and the delayed video signal. However, similarly to the input signal, this motion signal initially contains noise. Since this noise should not be applied to the recursive filter, it is suppressed by means of a threshold circuit and a low-pass filter. However, if this threshold circuit is not set to the correct threshold value, the recursive filter will fail to operate correctly. The known system provides a correction of the threshold value by noise measurement and rectification, but it is also responsive to movements, which leads to errors.

SUMMARY OF THE INVENTION

It is an object of the present invention to remove noise from the motion signal generated by forming the difference between the non-delayed and the delayed video signal so as to suppress, as far as possible, only the noise and not the signal components actually representing motion.

The method and apparatus in accordance with the invention provides an automatic optimization of the threshold value used for noise reduction in dependence upon the signal-to-noise ratio of the input signal. The method is performed by determining the absolute difference between an input signal to the motion detector and a delayed input signal, and by assigning a threshold value a minimum value. The minimum signal value of the absolute difference signal is then determined. The threshold value is increased when the minimum signal value exceeds a given value and is decreased when the minimum signal value is below the given value. The threshold value is thereby determined by the noise in the absolute difference signal and not by motion induced components in the input signal. Although the method in accordance with the invention is primarily intended for a motion signal of a noise reduction system, it can also be employed for other motion signals, for example those required for a predictive coding of video signals for standards converters.

A circuit arrangement for carrying out the method in accordance with the invention has the advantage that it requires little technical effort.

The measures defined in the subclaims enable advantageous modifications and improvements of the invention defined in the main Claim to be obtained.

BRIEF DESCRIPTION OF THE DRAWINGS

These and other aspects of the invention will now be described in more detail, by way of example, with reference to the drawings. In the drawings.

DETAILED DESCRIPTION OF THE PREFERRED EMBODIMENTS OF THE INVENTION

In the Figures like parts bear the same reference symbols.

Figure 1:
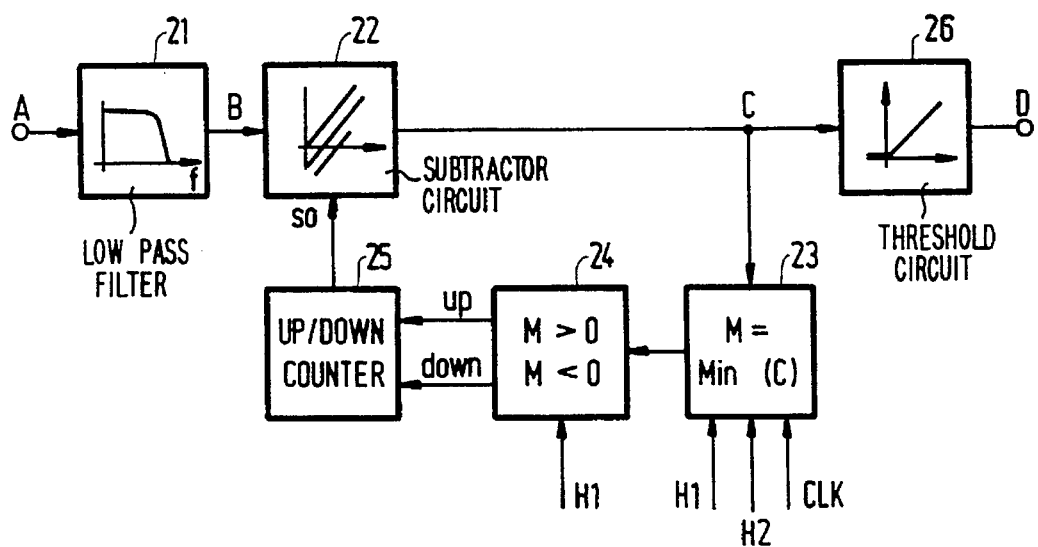
FIG. 1 is a block diagram of a circuit arrangement for carrying out the method in accordance with the invention.
Figure 2:
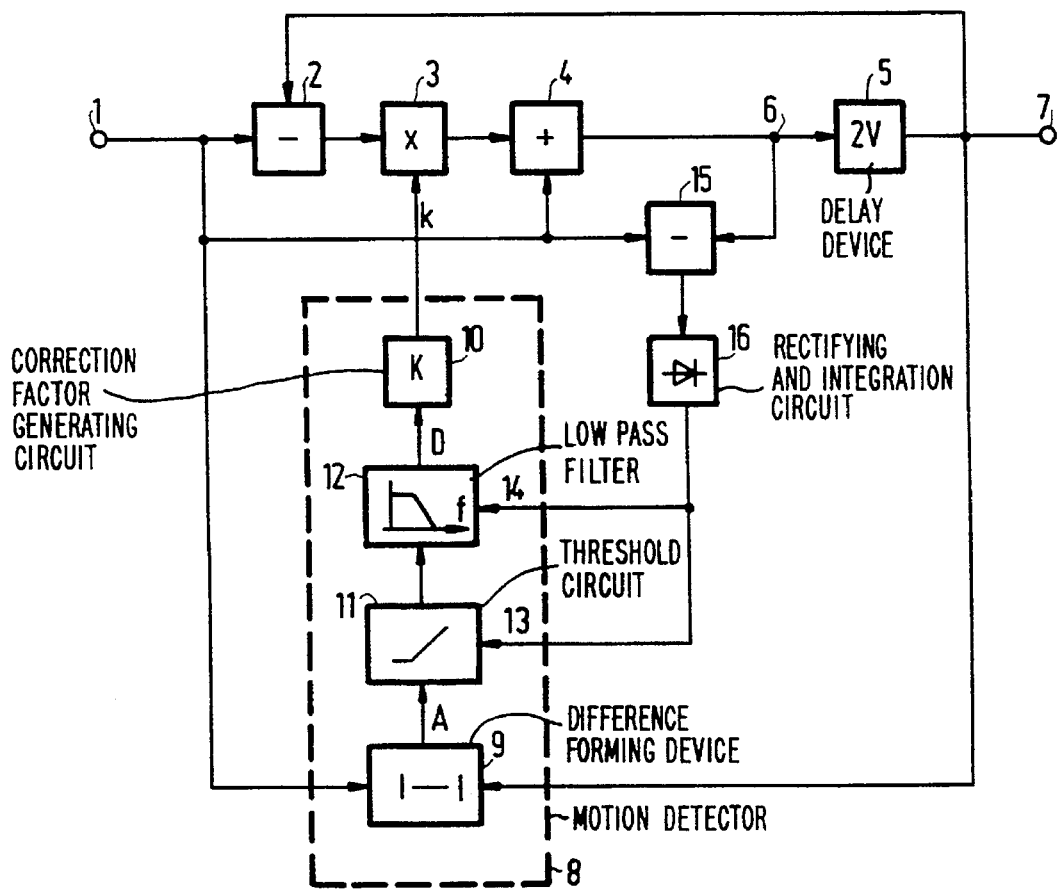
FIG. 2 is a block diagram of a known system for reducing noise in a television signal.

The known noise reduction system shown in FIG. 2 will be referred to before proceeding to a description of the circuit arrangement shown in FIG. 1. The video signal whose noise component is to be reduced is applied to 1. The signal is transferred to a delay device 5 via an adder circuit 4, which device delays the video signal for the duration of one picture period. Such delay devices are sufficiently well known and are suitably realised by means of a digital picture-memory. The delayed video signal appearing on the output of the delay device 5 is applied to a subtracter circuit 2, which subtracts the non-delayed video signal from the delayed video signal. The output of the subtracter circuit 2 is connected to a further input of the adder circuit 4 via a multiplier circuit 3. The arrangement comprising the circuits 2, 3, 4, 5 forms a recursive falter, which averages the signal amplitudes from picture to picture and reduces fluctuating amplitudes, particularly the noise.

The degree of averaging is dictated by a factor k applied to the multiplier circuit 3. The filter action increases, i..e. the averaging (integration) time increases, as k approximates more closely to the value 1. The television signal with reduced noise is available on point 6 or 7 of the circuit. In the case of steady pictures a substantially unlimited noise reduction can be achieved if a suitably long integration is applied.

However, in the case of moving picture scenes the integration will give rise to blurred edges. Therefore, the integration must be reduced in the case of motions in the picture. For this purpose there is provided a motion detector 8, which basically comprises a difference-forming device 9, which forms the difference between the non-delayed and the delayed video signal. Since the influence on the noise reduction should be independent of the sign of the change of the picture content the device 9 determines the magnitude (absolute value) of the difference. The circuit 10 generates a correction factor k for the degree of noise reduction in dependence upon the generated motion signal.

Since not only motion but also noise results in an output signal of the device 9, which noise should not be used for controlling the integration process, a threshold circuit 11 and a low-pass filter 12 have been arranged between the device 9 and the circuit 10. Said circuit and filter are controlled by a control voltage applied to the inputs 13 and 14 respectively. The threshold value is controlled by means of a subtracter circuit 15 followed by a rectifying and integration circuit 16. This is described in detail in DE 31 21 611 A1. However, since the signal formed by the subtracter circuit 15 also comprises motion-induced components, this method of controlling the threshold value of the threshold circuit 11 does not always result in an effective noise reduction of the motion signal.

In the circuit arrangement for carrying out the method in accordance with the invention, shown in FIG. 1, the signal A, which is generated by the difference-forming device 9, is applied to a subtracter circuit 22 via a low-pass filter 21. The subtracter circuit 22 is followed by a threshold circuit 26, which transfers only positive signal components. Its output signal is representative of the motion signal D, which is applied to the circuit 10 (FIG. 2) for the generation of the factor k. A circuit 23 determines the minimum of the output signal C of the subtracter circuit 22. For this purpose the instantaneous value of the signal C is stored in a memory if it is smaller than a given value. The circuit 23 receives a clock signal CLK and horizontal frequency pulses H1 and H2.

A discriminator 24 subsequently checks whether the minimum M thus determined is negative or positive. If M is positive, an up/down counter 25 is incremented, and if M is negative, said counter is decremented. The discriminator 24 also receives a line-frequency pulse H1.

The output of the up/down counter 25 is connected to an input of the subtracter circuit 22 to subtract the count from the signal C.

Figure 3A:
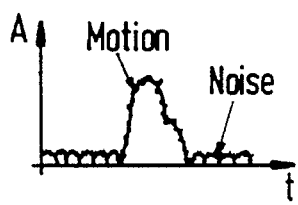
FIG. 3 shows time diagrams of some signals appearing in the circuit arrangement shown in FIG. 1.
Figure 3B:
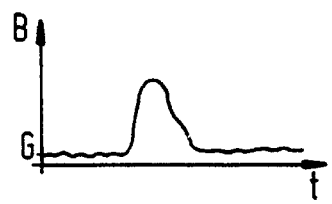
Figure 3C:
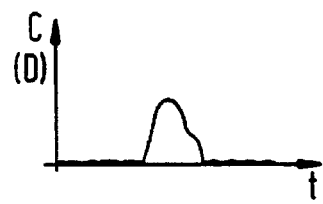

FIG. 3 shows signal waveforms in the circuit shown in FIG. 1. The signal A represents the signal A generated by means of the difference-forming device 9 (FIG. 2). After the low-pass filter 21, the noise in the signal B has been reduced to a considerable extent but an undesired d.c. component G is formed. This component should be eliminated by an appropriate setting of the threshold value SO, so that the signal C assumes the waveform shown by way of example. In the steady state of the control circuit the signal D corresponds to the signal C.

The operation of the circuit arrangement shown in FIG. 1, which forms a digital control device, will be described below with reference to the time diagrams in FIG. 4. The motion signal B contains the undesired d.c. component, whose digital value is for example 2. The threshold value is initially SO=0, which means that the signals C and B are identical. In order to calculate the magnitude of the d.c. component, the minimum of C is determined for the duration of an active line represented by the pulses H2. At the beginning of each line upon the pulse HI, the value M is therefore set to an initial value which is definitely larger than the expected minimum. In the example shown in FIG. 4 M=7. This initial value is dictated by the worst signal-to-noise ratio of the input signal to be processed or by the expected maximum d.c. component of the motion signal B. If a value smaller than the initial value occurs during a line, the smaller value will be adopted as the new minimum value M. At the end of the line it is assumed that the value M has decreased to the value of the d.c. component. In the present example, the value at the end of the first line shown is M=2, i.e. greater than 0. As a result of this, the threshold value SO is incremented by one. This is effected by incrementing the up/down counter 25 upon the next H1 pulse. If the value of M at the end of the line is smaller than 0, the count will be decremented.

Figure 4:
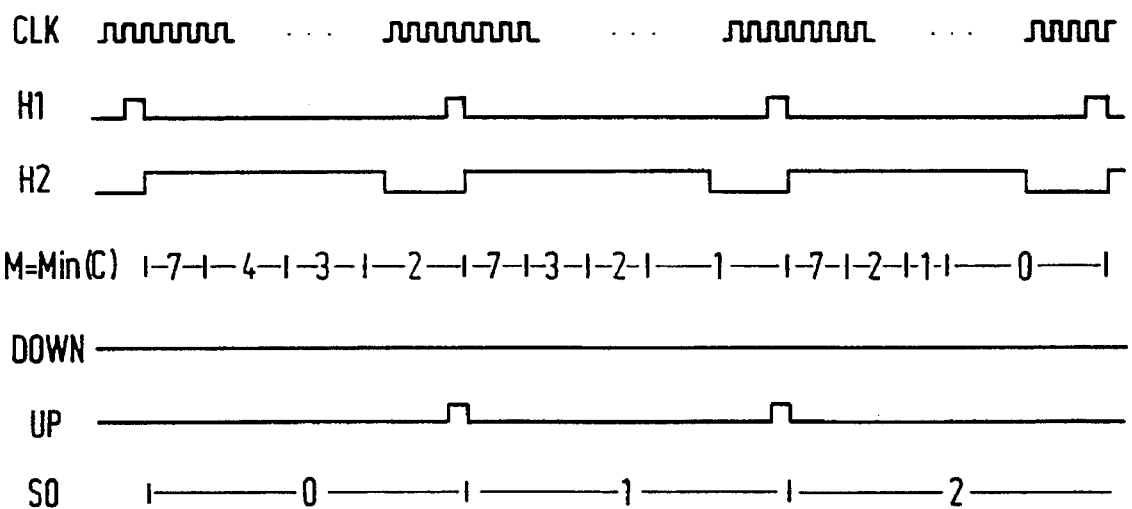
FIG. 4 gives further time diagrams to clarify the block diagram shown in FIG. 1.

Upon the next H1 pulse the determination of the minimum starts again and at the end of this pulse said minimum has the value M=1 in the example shown in FIG. 4, because the threshold value SO has been increased to one. Consequently, the up/down counter 25 is incremented again, so that the threshold value becomes SO=2. This value has reached the magnitude of the d.c. component of the signal B, so that the signal C has a minimum situated at 0. Since the control circuit has reached its steady state, the up/down counter 25 no longer receives any further pulses and the threshold value SO has its optimum setting.

I claim:

1. A method for reducing the noise in a signal provided by a motion detector, wherein a portion of the amplitude range of the signal from said motion detector is suppressed if the portion is below a threshold value, said method comprising the steps of:

a) determining the absolute difference between an input signal to the motion detector and a delayed input signal and providing an absolute difference signal representative of the absolute difference;

b) assigning the threshold value a minimum value;

c) determining a minimum signal value of the absolute difference signal;

d) determining whether the minimum signal value is above or below a given value;

e) increasing the threshold value when the minimum signal value exceeds a given value;

f) reducing the threshold value when the minimum signal value is below the given value; and g) subtracting the threshold value from the difference signal.

2. The method of claim 1, wherein the minimum signal value is zero.

3. The method of claim 1, wherein the minimum signal value is increased or decreased on a line-to-line basis.

4. An apparatus for reducing the noise in a signal provided by a motion detector which motion detector comprises an input for receiving an input signal and difference means for determining the absolute difference between the input signal and a delayed input signal and for providing an absolute difference signal, wherein a portion of the amplitude range of the signal from said motion detector is suppressed if said portion is below a threshold value, said apparatus comprising, in a control loop:

a) means for assigning the threshold value a minimum value;

b) means for determining a minimum signal value from the absolute difference signal and including a minimum circuit;

c) a discriminator coupled to the minimum circuit for determining whether the minimum signal value is above or below a given value;

d) an up/down counter coupled to the discriminator for increasing the threshold value when the minimum signal value exceeds the given value, and for reducing the threshold value when the minimum signal value is below the given value; and e) a subtractor coupled to said up/down counter for subtracting the threshold value from the difference signal.

5. A method for reducing the noise in a signal provided by a motion detector which motion detector comprises an input for receiving an input signal and absolute difference means for determining the absolute difference between the input signal and a delayed input signal and for providing an absolute difference signal, wherein a portion of the amplitude range of the signal from said motion detector is suppressed if the portion is below a threshold value, said apparatus comprising in a control loop:

- a subtractor for receiving the absolute difference signal and for producing an output signal representative of a motion signal;
- a threshold circuit coupled to receive the output signal and produce the motion signal;
- a minimum circuit coupled to receive the output signal, for forming the minimum of the output signal;
- a discriminator coupled to said minimum circuit for determining whether the minimum produced by said minimum circuit lies above or below a given value; and
- an up/down counter having an input coupled to said discriminator and an output coupled to said subtractor for incrementing and decrementing the threshold value in dependence on the minimum such that the magnitude of the DC component of the signal from said motion detector is represented at the output of said up/down counter and subtracted from the absolute difference signal by said subtractor, and wherein said threshold value is determined based on the noise in the absolute difference signal and independent of motion induced components in the input signal.

* * * * *